A. & F. BROWN.
Sugar Cutter.
No. 953.
Reissued May 1, 1860.
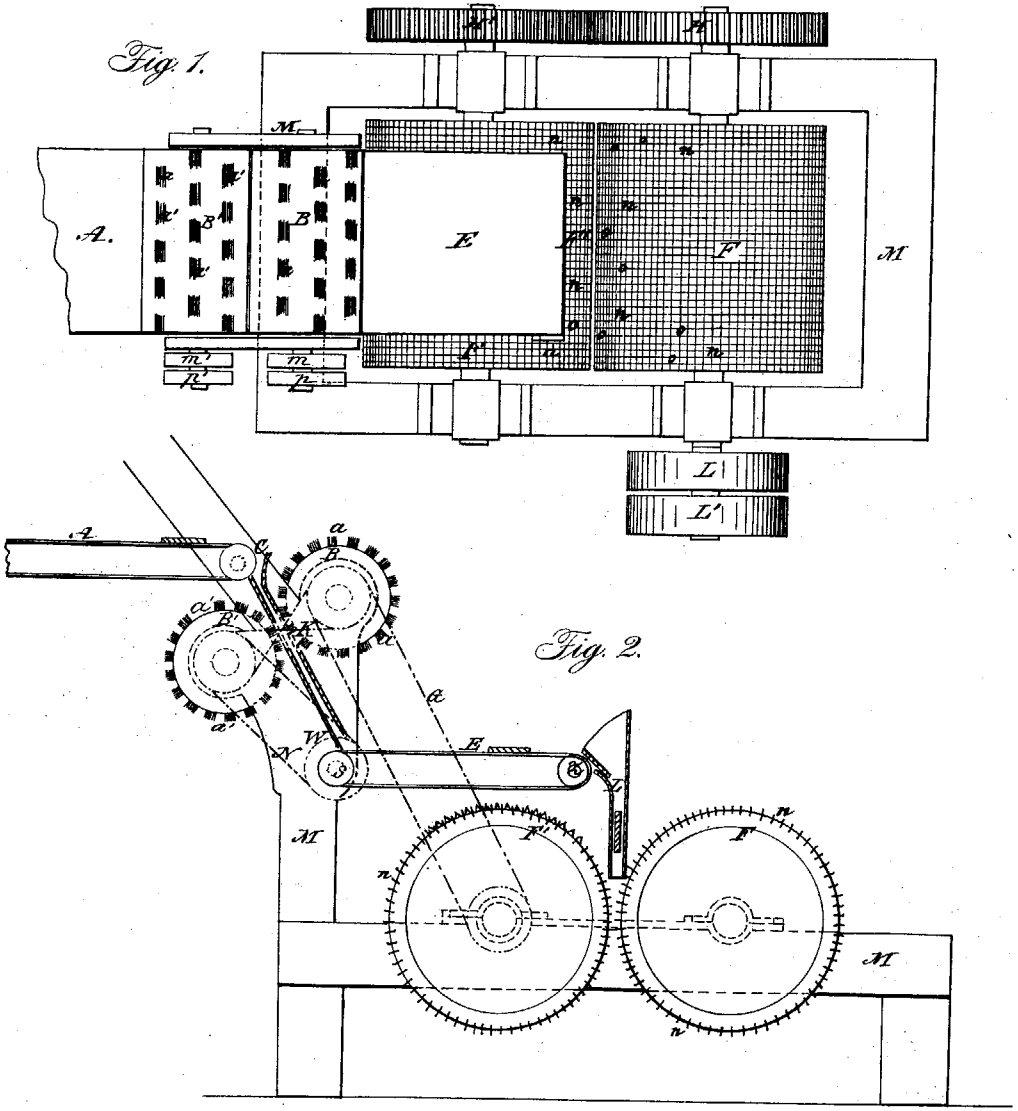
Witnesses:
Henry E. Baxter
Pat. H. Davidson
Inventor:
Adolph Brown
Felix Brown
AM. PHOTO-LITHO. CO. N.Y. (OSBORNE'S PROCESS.)

UNITED STATES PATENT OFFICE.

ADOLPH BROWN AND FELIX BROWN, OF NEW YORK, N. Y.

MACHINE FOR CUTTING LOAF-SUGAR.

Specification forming part of Letters Patent No. 14,490 dated March 25, 1856; Reissue No. 953, dated May 1, 1860.

*To all whom it may concern:*

Be it known that we, ADOLPH BROWN and FELIX BROWN, of New York, in the county and State of New York, have invented a new and useful Machine for Cutting Up Refined Loaf-Sugar into Regular Pieces; and we do hereby declare that the following is a full and exact description of the same, reference being had to the accompanying drawings, and to the letters of reference marked thereon.

The nature of our invention consists in means of cutting up refined sugar into regular and equal morsels. For that purpose we cut the loaf or lump sugar first into slices or slabs of the required thickness by means of straight or circular saws, then subject the slabs to the action of knives or cutters acting simultaneously upon both sides of the slab, the knives or cutters opposite each other corresponding substantially in shape, and also, when desirable, to employ brushes in the operation, to clean the slabs, as hereinafter described.

We will now describe the particular form of machine which we prefer in the use and operation of our invention.

In the accompanying drawings, Figure I represents a top view, and Fig. II a longitudinal section, of the machine.

The sugar, after having first been cut in slabs of the required thickness by straight or circular saws, or by any other similar contrivance, is put on an endless band, A, and carried by the same into the hopper C. In the sides of this hopper C openings are made covered with wire, so that the brushes *a a'*, fast to the periphery of the drums B B', can reach into the hopper, so as to clean the slabs of sugar, as they pass down said hopper, from the dust adhering to the same from the process of being cut into slabs. By this process of cleaning or brushing of the sawdust the crystals are reproduced on both sides of the slabs. The drums B B' run in bearing in the frame M, and are each provided with two pulleys, *m p* and *m' p'*, fast to these shafts, respectively. The slabs of sugar, which have by the above-described process acquired again their crystal appearance on the sides, fall upon the endless band E, running over rollers *s* and *z*, and are carried by the same into the second hopper, D, and from there between the cutting-rollers F F', to be cut up into regular pieces. These cutting-rollers F F' consist of drums, made of wood or iron, running in bearings fastened to the frame M. Steel plates, knives, or cutters *n* are fastened into the circumference of these drums, parallel to each other, and of such distances apart as are desired to cut the morsels out of the slabs of sugar. These knives or cutters *n* have recesses or notches, into which the cross-knives *o* are fitted, running parallel with the axes of the drums and to each other, and forming with the knives *n* squares equal to the size as it may be desirable to have the morsels or lumps of sugar. These knives or cutters *o* are secured to the drums, and hold thereby at the same time the other knives, *n*, in their places.

H H' are tooth-wheels, fast on the shafts of the rollers F F', to connect both rollers together.

L L' are fast and loose pulleys on the shaft of the roller F, to apply power to the same.

M is the frame of the machine.

Motion being given to the roller F, the same will be communicated through the gearing H and H' to the roller F', and through the band G, passing over the shaft of the drum F' and the pulley *p* to the drum B. The drums B and B' are connected together by the band K, passing over the pulleys *m* and *m'*, and the band N, passing over the pulley *p'*, and the pulley *w*, fast to the end of the roller *s*, communicates motion to the endless band E. The gearing-wheels H and H' are so arranged as to bring the edges of the knives or cutters *o*, during the revolution of the drums, directly opposite each other, to act simultaneously on both sides of a slab of sugar, causing thereby the cracking of the slabs of sugar by the mere indentation of the antagonistic points of the knives or cutters, which give a direction to the fracture.

The use of the brushes being only to clean off the dust of sugar and give the pieces more brightness, of course they can be omitted and the reduction of the sugar can be carried on without them.

What we claim as our invention, and desire to secure by Letters Patent, is—

1. The application and use of two or more rollers, having brushes around their circumferences, and acting upon both sides of slabs of sugar, for the purpose of cleaning off the dust adhering to the same by the process of sawing, thereby reproducing the appearance of the crystals, as described.

2. In a machine for cutting loaf-sugar, the combination of two circular surfaces, with knives or cutters on each, and the knives or cutters opposite each other, substantially corresponding in form, and so combined that in operation the knives or cutters will act simultaneously on each side of the slab of sugar in the manner and for the purpose substantially as described.

ADOLPH BROWN.
FELIX BROWN.

Witnesses:
JAMES W. POE,
HENRY E. ROEDER.